(12) United States Patent
Kerin et al.

(10) Patent No.: US 7,472,931 B2
(45) Date of Patent: Jan. 6, 2009

(54) COUPLING ASSEMBLY FOR TUBING AND HOSE CONNECTIONS

(75) Inventors: Jim Kerin, Grosse Pointe Woods, MI (US); Stephen H. Gunderson, Marine City, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 79 days.

(21) Appl. No.: 11/219,384

(22) Filed: Sep. 2, 2005

(65) Prior Publication Data

US 2006/0082150 A1 Apr. 20, 2006

Related U.S. Application Data

(60) Provisional application No. 60/609,399, filed on Sep. 13, 2004.

(51) Int. Cl.
*F16L 37/00* (2006.01)
(52) U.S. Cl. .................... 285/319; 285/256; 285/133.3; 285/133.21
(58) Field of Classification Search ................. 285/319, 285/256, 133.3, 133.21
See application file for complete search history.

(56) References Cited

U.S. PATENT DOCUMENTS

| | | | |
|---|---|---|---|
| 2,272,811 A | 2/1942 | Nathan | |
| 4,650,223 A | 3/1987 | Miyazaki et al. | |
| 4,681,351 A | 7/1987 | Bartholomew | |
| 4,846,506 A | 7/1989 | Bocson et al. | |
| 4,925,217 A | 5/1990 | Ketcham | |
| 4,948,175 A | 8/1990 | Bartholomew | |
| 4,948,176 A | 8/1990 | Bartholomew | |
| 5,044,675 A | 9/1991 | Sauer | |
| 5,064,227 A | 11/1991 | Spors et al. | |
| 5,067,754 A | 11/1991 | Bartholomew | |
| 5,131,691 A | 7/1992 | Washizu | |
| 5,195,787 A | 3/1993 | Bartholomew | |
| 5,219,188 A | 6/1993 | Abe et al. | |
| 5,423,577 A | 6/1995 | Ketcham | |
| 5,542,717 A | 8/1996 | Rea | |
| 5,573,279 A | 11/1996 | Rea et al. | |
| 5,626,371 A | 5/1997 | Bartholomew | |
| 5,752,726 A | 5/1998 | Fixemer | |
| 5,897,145 A | 4/1999 | Kondo | |
| 5,931,510 A | 8/1999 | Mathew et al. | |
| 6,079,750 A * | 6/2000 | Kacines ....................... | 285/62 |
| 6,086,119 A | 7/2000 | Hansel | |
| 6,152,496 A * | 11/2000 | Kouda ........................ | 285/316 |
| 6,173,998 B1 * | 1/2001 | Bock .......................... | 285/319 |
| 6,186,561 B1 | 2/2001 | Kaishio | |
| 6,189,199 B1 | 2/2001 | Ouchi et al. | |
| 6,279,966 B1 | 8/2001 | Kondo et al. | |
| 6,390,511 B1 * | 5/2002 | Kargula ...................... | 285/308 |

(Continued)

FOREIGN PATENT DOCUMENTS

| | | |
|---|---|---|
| EP | 0566889 A1 | 10/1993 |
| EP | 0971163 A2 | 1/2000 |
| EP | 1241390 A1 | 9/2002 |
| EP | 1445527 A1 | 8/2004 |
| GB | 2240148 A | 7/1991 |
| GB | 2240150 A | 7/1991 |

*Primary Examiner*—David E Bochna
(74) *Attorney, Agent, or Firm*—Leydig, Voit & Mayer, Ltd

(57) ABSTRACT

A fitting or coupling to connect a rigid tube to a flexible hose. It has a through bore and includes a quick connector port at one end and a crimp collar at the other. In one form the coupling includes multiple quick connector ports.

17 Claims, 6 Drawing Sheets

U.S. PATENT DOCUMENTS

| | | |
|---|---|---|
| 6,481,758 B1 | 11/2002 | Andre et al. |
| 6,536,807 B1 | 3/2003 | Raymond et al. |
| 6,540,264 B1 | 4/2003 | Yokoyama et al. |
| 6,550,815 B2 * | 4/2003 | Zitkowic et al. .......... 285/120.1 |
| 6,857,663 B2 * | 2/2005 | Nagata et al. ................. 285/81 |
| 6,857,667 B2 | 2/2005 | Malone |
| 6,866,304 B2 | 3/2005 | Kaminski et al. |
| 6,883,779 B2 | 4/2005 | Borgmeier |
| 6,938,651 B1 * | 9/2005 | Carter et al. .................. 141/67 |
| 2003/0184089 A1 | 10/2003 | Takayanagi et al. |
| 2005/0221679 A1 | 10/2005 | Takayanagi |
| 2006/0082149 A1 | 4/2006 | Gunderson .................. 285/319 |

* cited by examiner

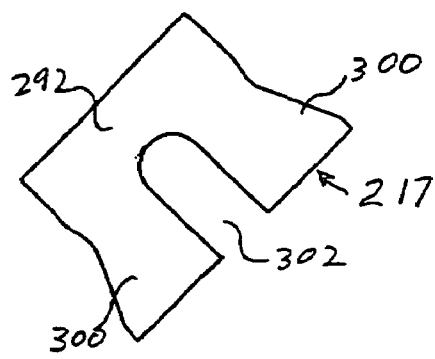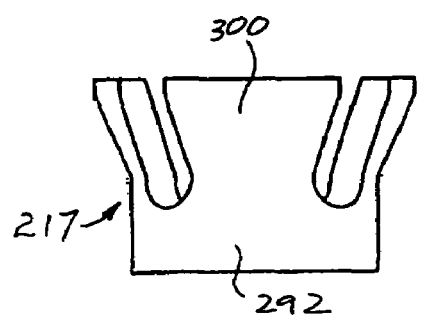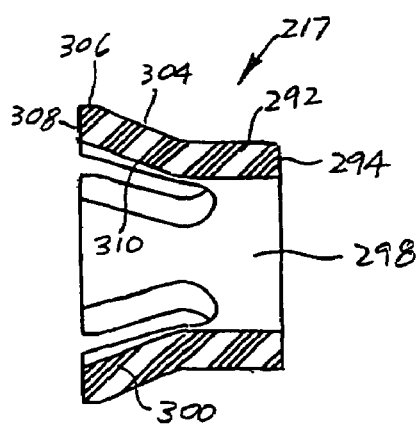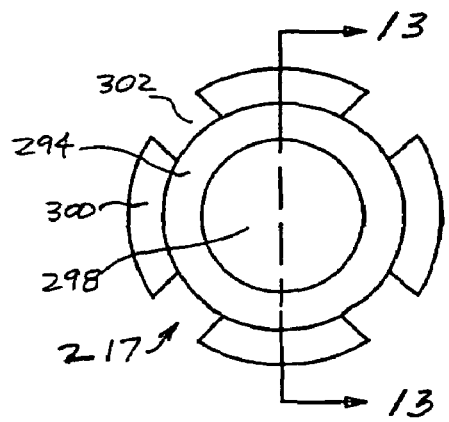
FIG. 11  FIG. 10
FIG. 13  FIG. 12

COUPLING ASSEMBLY FOR TUBING AND HOSE CONNECTIONS

This application claims the benefit, pursuant to Title 35 U.S.C. §119, of provisional application Ser. No. 60/609,399 filed Sep. 13, 2004, the content of which is hereby incorporated by reference. This application is related to application Ser. No. 11/218,666, filed Sep. 5, 2005, entitled "Quick Connector For High Pressure Applications." Both this application and application Ser. No. 11/218,666 claim priority to application 60/609,399 filed Sep. 13, 2004.

BACKGROUND OF THE INVENTION

This application relates to coupling assemblies. In particular, it relates to a coupling having a body for connecting a rigid tube to a flexible hose.

In many fluid system applications it is necessary to connect a rigid tube that comprises part of the fluid system to a flexible hose. Such an arrangement is often necessary where relative movement exists between different parts within a fluid system. An example is found in vehicular brake systems where rigid metal tubes form part of the fluid line and are connected by flexible hose to a brake caliper or other component. There is relative movement between parts of the vehicle that carry, for example, the master cylinder and associated rigid lines, and the brake cylinders at the vehicle wheels. To accommodate such movement, a flexible line must be incorporated into the system. Such a flexible line is usually in the form of a flexible rubber or polymeric hose called a jounce line.

A coupling to connect a rigid tube to a flexible hose has numerous other applications. Moreover, it has been determined that a coupling that couples a plurality of rigid tubes to a single flexible hose is also a desirable fluid system component.

To make the transition between a rigid line and a flexible line, a coupling or fitting must provide a fluid tight connection to the rigid tube, and also to a flexible hose. In high pressure applications, the portion that connects to the flexible hose must take the form of a crimp connection to ensure that no fluid leakage exists in the system.

The coupling or fitting, therefore, has an end arranged to be connected to a flexible hose by a crimp connection. The other end of such a coupling is traditionally a threaded connection to a flare on the tube end. Such a fitting is shown in FIG. 1. There are fitting 114 is connected to a flexible hose 115 by a crimp connection 116 at one end of the fitting 114. The opposite end of the fitting defines a threaded bore 118 with an interior conical surface 120 or seat to receive the flare of an end of a rigid tube. A threaded nut (not shown) carried by the rigid tube is screwed into the threaded bore 118 until it forces the tube end against the conical surface 120 to seat the seat tube in a fluid tight relation.

This design has several disadvantages. It has a propensity to leak due to the threaded connection interfaces and the differences between the surface condition of each component. Also, the labor involved in installing the assembly is substantial. It requires a torque operation to the mating components usually in a confined area. Extra clips are required to keep the tube from rotating during torque operations. Cross-threading, rework and scrap associated with torque process is prevalent. Bulky torque guns and hand starting fittings are required.

The present invention is directed to a connector that greatly reduces the possibility of a leak by eliminating the leak path between two machined components, (tube fitting to crimp collar). The present invention also provides for a method of installation which is much less labor intensive than a torque operation during assembly. It also combines a high-pressure quick connector body and a crimp collar shell into one unique fluid coupling.

In the automotive and other fields, one type of coupling assembly often utilized to provide a fluid connection between two components or conduits are quick connectors, which generally include a male member received and retained in a female connector body. Use of a quick connector is advantageous in that a sealed and secure fluid line may be established with minimum amount of time and expense.

A retainer is often used to secure the male member within the connector body. One such type of retainer includes a plurality of locking members which extend between a radially enlarged upset formed on the male member and an annular face defined in the connector body. The abutment of the retainer with the upset of the male member at one end and the annular face of the connector body at the other end prevents the withdrawal of the male member from the connector body. This type of retainer is prevalent in the art and has proven effective in many fluid line applications.

The present invention incorporates the benefits of a quick connector coupling for connection to a rigid tube coupling with the direct connection to a flexible hose by incorporating into a single coupling element a configuration to receive a quick connect coupling to a rigid tube and a crimp connector for connection to a flexible hose.

Such an arrangement greatly reduces the time to make and verify a fluid connection. It eliminates the use of a threaded connection and the well known disadvantages associated with threaded connection. It reduces assembly processing costs and labor scrap resulting from misconnections of threaded fittings and provides an improved joint with a reliable fluid tight seal.

The invention relates to a fluid coupling that connects a flexible hose on one side of the body and the other side a built-in port that will house the internal workings of a quick connector. In other words, the fluid coupling comprises a connector part to retain the rigid hydraulic line and a hose connection in the form of a crimp collar to retain the flexible hose.

The connector body has a through bore to provide a fluid passage between the connected tube and hose elements. This will allow the fluid path to be uninterrupted. It has an entrance opening and defines a retainer receiving portion and a seal receiving portion to form a quick connection port. The opposite end defines a crimp collar to receive a flexible hose.

The connector pocket or port retains the hydraulic lines within the connector body at the entrance side and at the terminal end the crimp collar mechanism is used to secure a flexible hose to the connector body.

Another embodiment is a multiple port coupling. It has multiple connector ports to accommodate the plurality of rigid hydraulic lines secured by quick connector. Such a fluid coupling is particularly desirable for use as a junction block where plural hydraulic lines join together.

BRIEF DESCRIPTION OF THE DRAWINGS

FIG. 10 is a side view of a spacer utilized in the embodiment of FIG. 2;

FIG. 11 is a side perspective view of the spacer illustrated in FIG. 10;

FIG. 12 is a front view of the spacer illustrated in FIG. 10;

FIG. 13 is a cross-sectional view of the spacer taken along line 13-13 as shown in FIG. 12;

DETAILED DESCRIPTION

Figure 1:
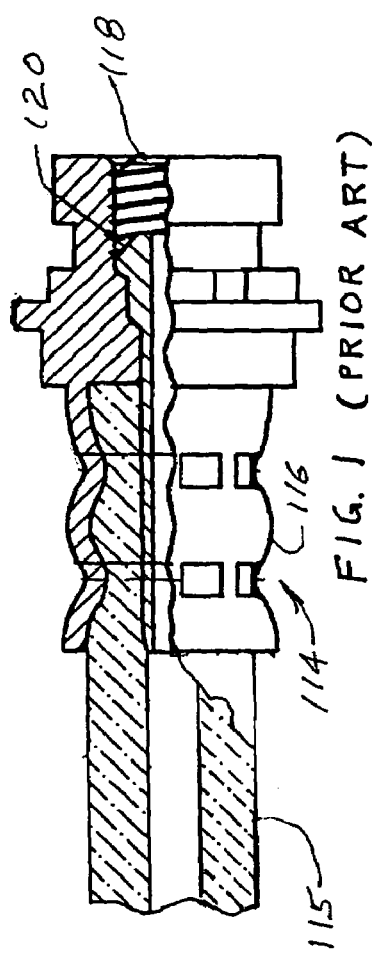
FIG. 1 is a side view partially in section of a prior art fitting.
Figure 2:
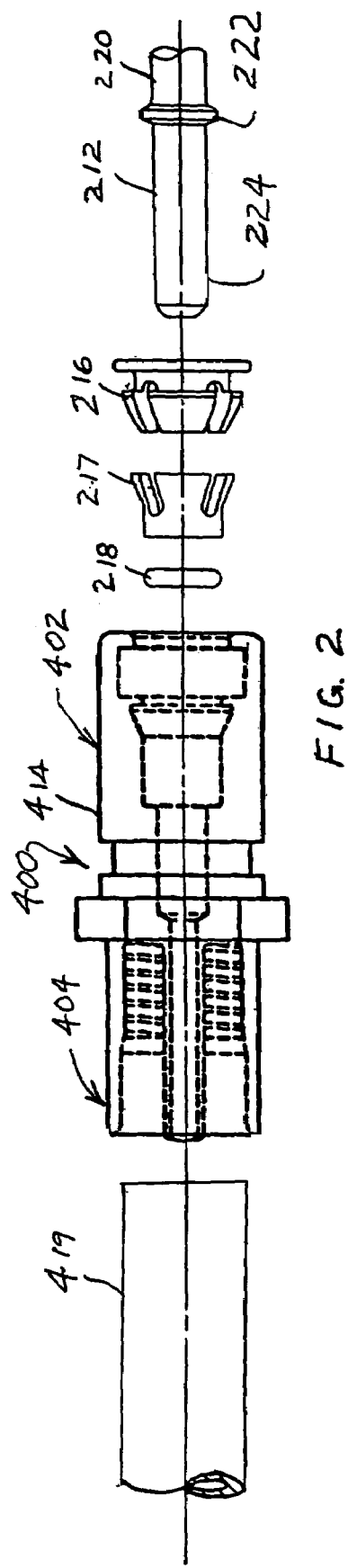
FIG. 2 is an exploded view of a fluid coupling in accordance with the present invention.

A fluid coupling in accordance with the present invention is illustrated in FIGS. 2-15. The fluid coupling comprises a coupling body 400 having a quick connector portion 402 and a hose connection portion 404. The coupling defines a through bore for fluid communication between connected fluid system elements.

The quick connector portion includes a hollow connector body portion 414, a retainer 216 for securing a male member 212 within the connector body portion 414, an O-ring or seal member 218, a seal member retainer 217 preventing axial movement of the O-ring 218 relative to the connector body 414. Hose connection portion 404 includes a crimp collar portion 428 to connect to flexible hose 428.

A male member 212 is formed at the end of a hollow and rigid tube 220 which forms a part of a fluid line system. The tube 220 may lead to a component in a fluid line system, or may itself be a portion of a component in a fluid line system. The male member 212 includes a radially enlarged annular upset 222 formed at a given distance from the terminal end. The male member 212 also includes a cylindrical portion 224 between the upset 222 and the terminal end. The cylindrical portion 224 has a diameter approximately equal to the diameter of the tube 220.

Figure 5:
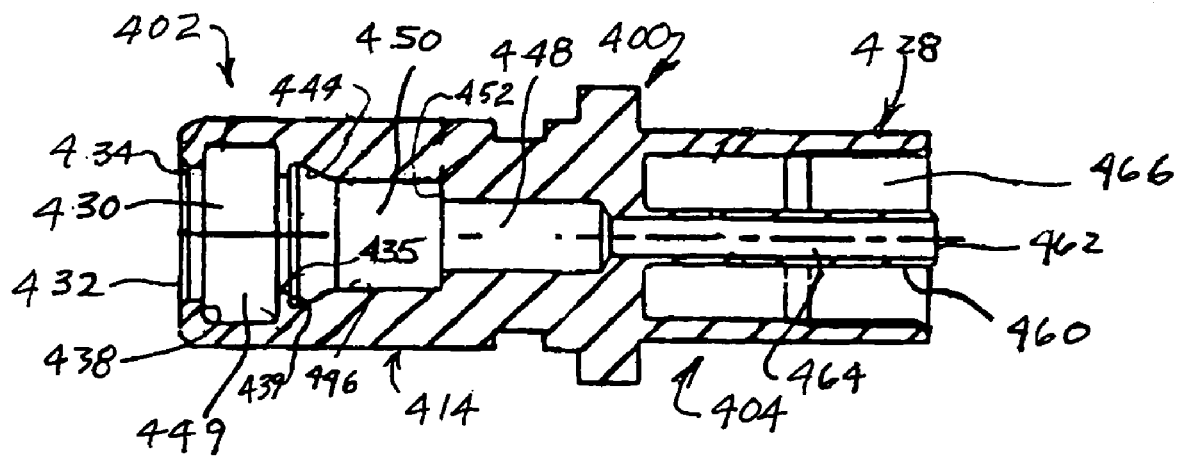
FIG. 5 is a cross-sectional view of the fluid coupling along line 5-5 as shown in FIG. 4.
Figure 6:
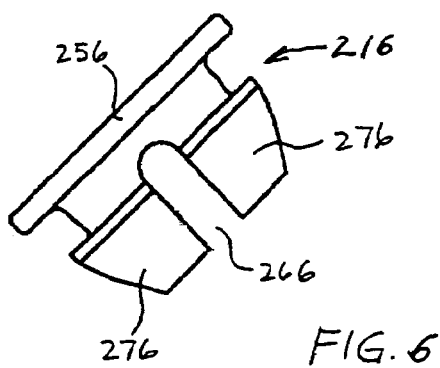
FIG. 6 is a perspective view of the retainer utilized in the embodiment of FIG. 2.
Figure 7:
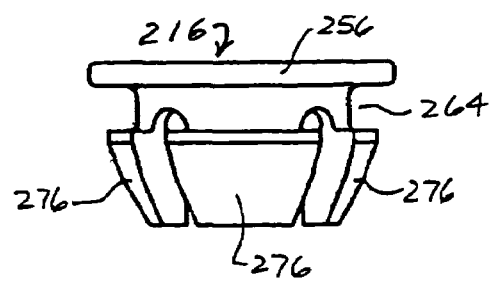
FIG. 7 is a side view of the retainer illustrated in FIG. 6.
Figure 9:
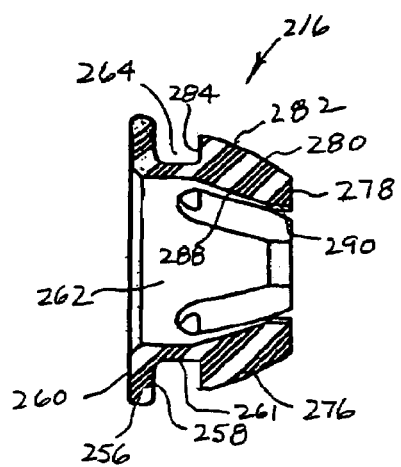
FIG. 9 is a cross-sectional view of the retainer along line 9-9 as shown in FIG. 8.
Figure 8:
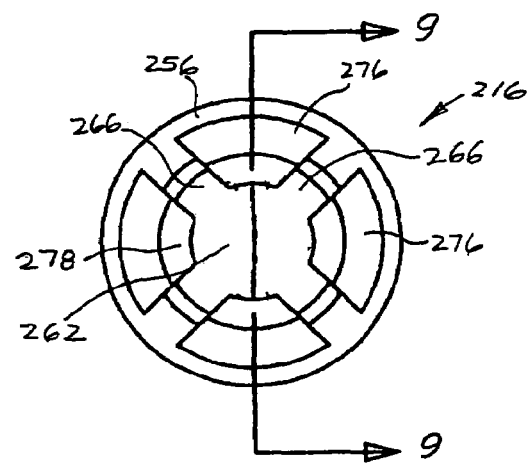
FIG. 8 is a front view of the retainer illustrated in FIG. 6.
Figure 14:
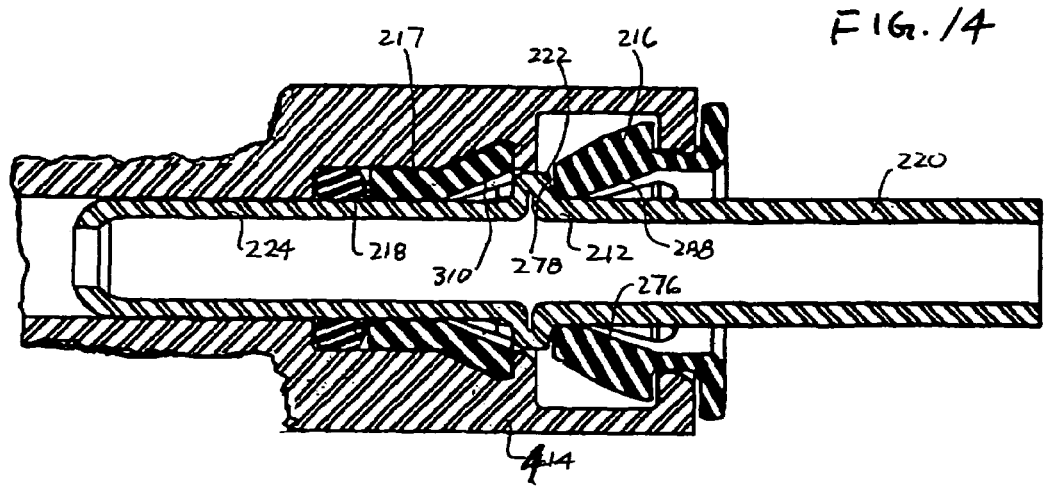
FIG. 14 is a sectional side view of the connector body portion of an assembled coupling embodying the present invention.

The connector body portion 414 is best illustrated in FIG. 5. The female connector body portion 414 is hollow and defines an axial bore 430 extending axially inwardly from a first opening 432. The bore 430 is divided into three portions: a retainer receiving portion 449, a seal receiving portion 450, and a reduced diameter portion 448. The first opening 432 is defined by a radially inwardly extending rim 434 having an outward surface and a first annular face 438. The rim 434 is chamfered at the outward surface to facilitate the insertion of the retainer 416 into the retainer receiving section 449. Axially inward from the rim 434 is a first cylindrical surface. Axially inward from the first cylindrical surface is a radially inwardly extending annular rib 435 having an outward surface and a second annular face 439. The first annular face 438, the first cylindrical surface and the outward surface of the annular rib 435 define the retainer receiving portion 449 of the axial bore 430.

The annular rib 435 is chamfered at the outward surface to facilitate the insertion of the spacer 217 into the seal receiving section 450. Axially inward from the annular rib 435 is a conical surface 444 and a second cylindrical surface 442 terminating at a shoulder 452. The second annular face 439, the conical surface 444, the second cylindrical surface 442 and the shoulder 452 define the seal receiving portion 450 of the axial bore 430. Axially inward from the shoulder is the reduced diameter portion 448 of the axial bore 430 that is in fluid communication with the hose connection portion of the coupling.

The retainer 216 is illustrated in FIGS. 6-9. The retainer 216 includes a cylindrical ring 256 at a first axial end. The ring 256 has a forward facing surface 258, a rearward facing surface 260 and a reduced diameter cylindrical surface 261. A bore 262 is defined in the ring 256. Four duckbill shaped flexible arms 276 extend axially forward and radially inward from the ring 256. The arms 276 are not connected at a second axial end. Four axially extending elongated slots 266 are defined between each of the adjacent arms 276 and extend from the second axial end to the ring 256. The slots 266 allow the arms 276 to flex radially relative to the ring 256. Each arm 276 has a front abutment surface 278, a first ramped top surface 280, a second ramped top surface 282, a rear abutment surface 284, a ramped bottom surface 288, and a cylindrical bottom surface 290. The forward facing surface 258 of the ring 256, the reduced diameter cylindrical surface 261 of the ring 256, and the rear abutment surfaces 284 of the arms 276 defines a channel 264. The channel 264, and thus the reduced diameter surface 261, is configured and sized to allow the rim 434 of the connector body portion 414 to be situated and retained in the channel 264.

The spacer or seal member retainer 217 is illustrated in FIGS. 10-13. The seal retainer 217 includes a cylindrical ring 292 at a first axial end. The ring 292 has a forward facing surface 294. A bore 298 is defined in the ring 292. Four legs 300 extend axially rearward and radially outward from the rear of the ring 292. The legs 300 are not connected at a second axial end. Four axially extending elongated slots 302 are defined between each of the adjacent legs 300 and extend from the second axial end to the ring 292. The slots 302 allow the legs 300 to flex radially relative to the ring 292. Each leg 300 has a ramped top surface 304, a cylindrical top surface 306, a rear abutment surface 308, and a conical bottom surface 310.

Figure 3:
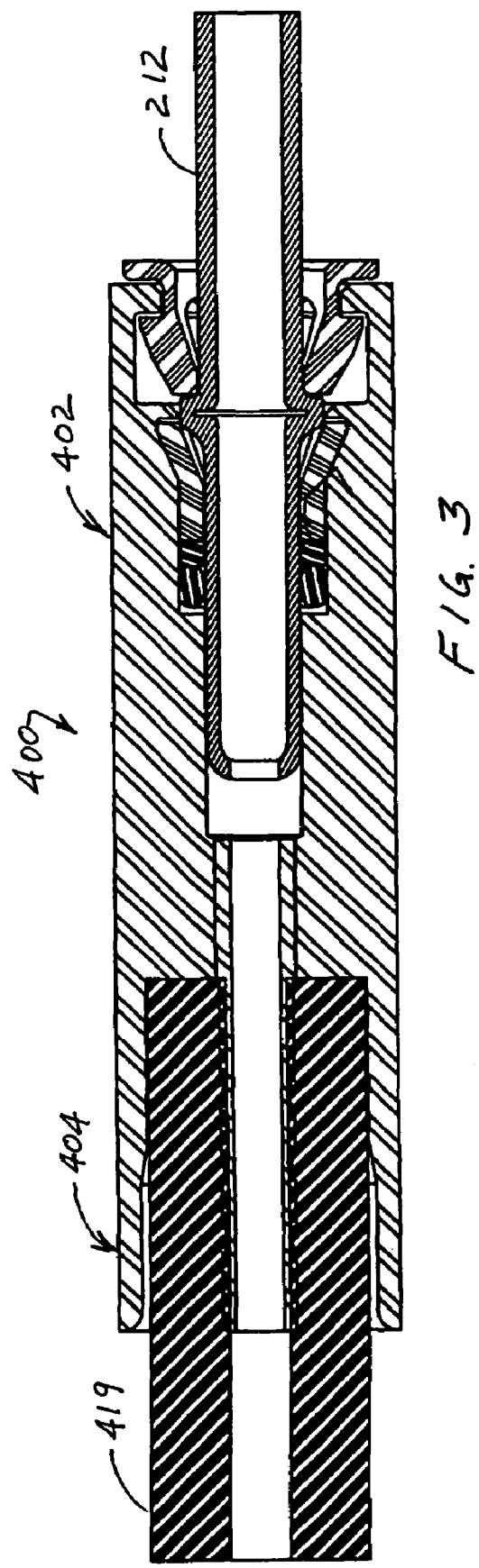
FIG. 3 is a sectional view of the fluid coupling of FIG. 2.
Figure 4:
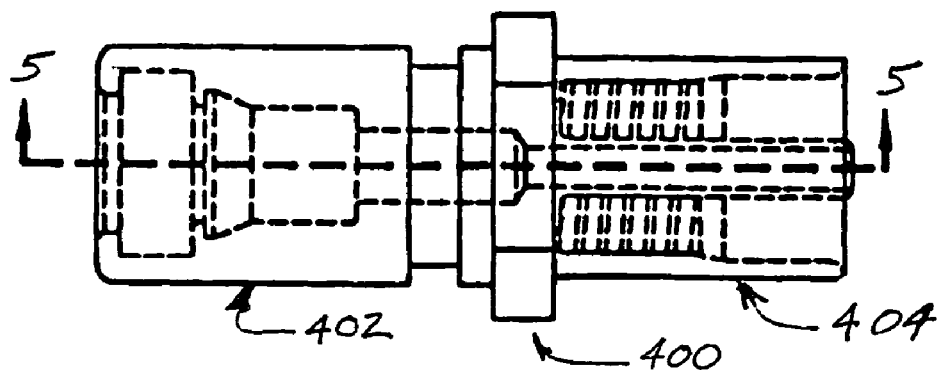
FIG. 4 is a side view of the fluid coupling body illustrated in FIG. 2.

To form the quick connection of the tube to the fluid coupling as illustrated in FIGS. 3 and 11, the O-ring 218 is positioned within the seal receiving portion 450 of the connector body portion 414. The spacer 217 is then inserted into the seal receiving portion 450 of the connector body portion 414. As the spacer 217 is inserted axially inward into the connector body portion 414, the ramped top surface 304 of each leg 300 contacts the rim 434. Further insertion of the spacer 217 in the axially inward direction causes the legs 300 to flex radially inward relative to the ring 292. After the legs 300 have surpassed the rim 434, the legs 300 spring radially outward within the retainer receiving portion 449 of the connector body 214. Upon further axially inward insertion of the spacer 217, the ramped top surface 304 of each leg 300 contacts the annular rib 435. The legs 300 then flexes radially inward relative to the ring 292. After the legs 300 have surpassed the annular rib 435, the legs 300 spring radially outward within the seal receiving portion 450 to a position that the ramped top surface 304 is located immediately radially inward of the conical surface 444 of the connector body 414 with the rear abutment surface 308 in abutting relation with the annular face 439 of the annular rib 235. In its properly inserted position, the spacer 217 is constrained radially and axially within the seal receiving portion 449 of the connector body 414. The ring 292 abuts the second cylindrical surface 442 and the ramped top surface 304 abuts the conical surface 444 to constrain the spacer 217 radially within the connector body 214. The ramped top surface 304 abuts the conical surface 444 to prevent the spacer 217 from moving axially inward. The rear abutment surfaces 308 of the legs 300 abut the annular face 439 of the annular rib 435 to prevent the spacer 217 from moving axially outward.

With the spacer 217 properly inserted into the seal receiving portion 249 of the connector body portion 414, the O-ring 218 is constrained radially and axially within the seal receiving portion 449 of the connector body portion 414. The outer diameter surface of the O-ring 218 abuts the second cylindrical surface 442 of the to constrain the O-ring 218 radially within the connector body 414. The O-ring 218 abuts the shoulder 452 to prevent the O-ring 218 from moving axially inward. The O-ring ring abuts the forward facing surface 294 of the spacer 217 to prevent the O-ring 218 from moving axially outward.

Once the seal retainer 217 has been properly inserted into the seal receiving portion 449 of the connector body portion 414, the retainer 216 is then inserted into the connector body portion 414. As the retainer 216 is inserted into the connector body 214, the first ramped top surface 280 of each arm 276 contacts the rim 434. Further insertion of the retainer 216 axially inward causes the arms 276 to flex radially inward relative to the ring 256. After the retainer 216 has been properly inserted into the retainer receiving portion 449 of the connector body portion 414, the arms 276 spring radially outward. In its properly inserted position, the retainer 216 is constrained radially and axially within the connector body portion 414 The rim 434 is situated in the channel 264 of the retainer 216. The cylindrical surface 261 abuts the rim 234 to constrain the retainer 216 radially within the connector body portion 414. The forward facing surface 258 of the ring 256 abuts the outer surface of the rim 434 to prevent the retainer 216 from moving axially inward. The rear abutment surfaces 284 of the arms 276 abut the first annular face 438 of the annular rib 435 to prevent the retainer 216 from moving axially outward.

With the spacer 217 and the retainer 216 properly inserted into the connector body 214, the male member 212 is then inserted into the assembly. As the male member 212 is inserted axially inward into the upset 222 of the male member 212 contacts the ramped bottom surfaces 288 of the arms 276. Since the diameter of the upset 222 is greater than the diameter of portions of the ramped bottom surfaces 288, further axially inward insertion of the male member 212 causes the arms 276 to spread radially outward. Once male member 212 has been sufficiently inserted axially inward for the upset 222 to surpass the arms 276, the arms 276 spring radially inward.

The male member 212 is constrained radially and axially within the connector body portion 414. The cylindrical portion 224 of the male member 212 abuts the cylindrical surface defining the reduced diameter portion 428 to constrain the male member 212 radially within the connector body 214. The conical bottom surface 310 of the seal retainer 217 abuts the forward surface of the upset 222 to prevent the male member 212 from moving axially inward. The rearward surface of the upset 222 abuts the front abutment surfaces 278 of the arms 276 to prevent the male member 212 from moving axially outward.

Turning now to the hose connection portion 404 of the coupling 400 there is provided a crimp connection in the form of crimp collar or shell 428. Located radially inward of the crimp collar 428 is a barrel 460 defining an opening to a barrel bore 464 extending axially into the coupling and joining in fluid communication with reduced diameter portion 448 of axial bore 430. The barrel bore 464 intersects the axial bore 430. An annular groove 466 is defined radially between radially inner surface of the crimp collar 428 and the radially outer surface of the barrel 460. The diameter of the annular groove 466 is approximately the same diameter of the flexible hose 419 to which the connector body 414 is to be connected. Likewise, the thickness of the annular groove 466 is slightly larger than the thickness of the flexible hose 419.

To establish the fluid path from the flexible hose 419 to the rigid tubing 420, the flexible hose 419 is installed to hose connection portion 404 of coupling 400. The terminal end of the flexible hose 419 is inserted into the annular groove 466 defined between the crimp collar 428 and the barrel 460. After the flexible hose 419 is inserted into the annular groove 466, the crimp collar 428 is crimped or crushed radially inward, thereby collapsing the groove 466 and pinching the flexible hose 419 between the crimp collar 428 and the barrel 460. This crimping process retains the flexible hose 419 to the coupling 400 and provides a seal to prevent fluid leakage between the crimp collar 428 and the flexible hose 419. The completed crimp connection to hose 419 is exemplified by the hose connector illustrated in FIG. 1.

Once the flexible hose is installed to the hose connector portion 404, the rigid tubing 420 is inserted into the quick connector portion 402. Often the coupling 400 is connected to a brake system component such as an activator at the vehicle wheel. When the vehicle is assembled, the quick connector portion 402 of the coupling 400 is connected to a tube 412.

Figure 15:
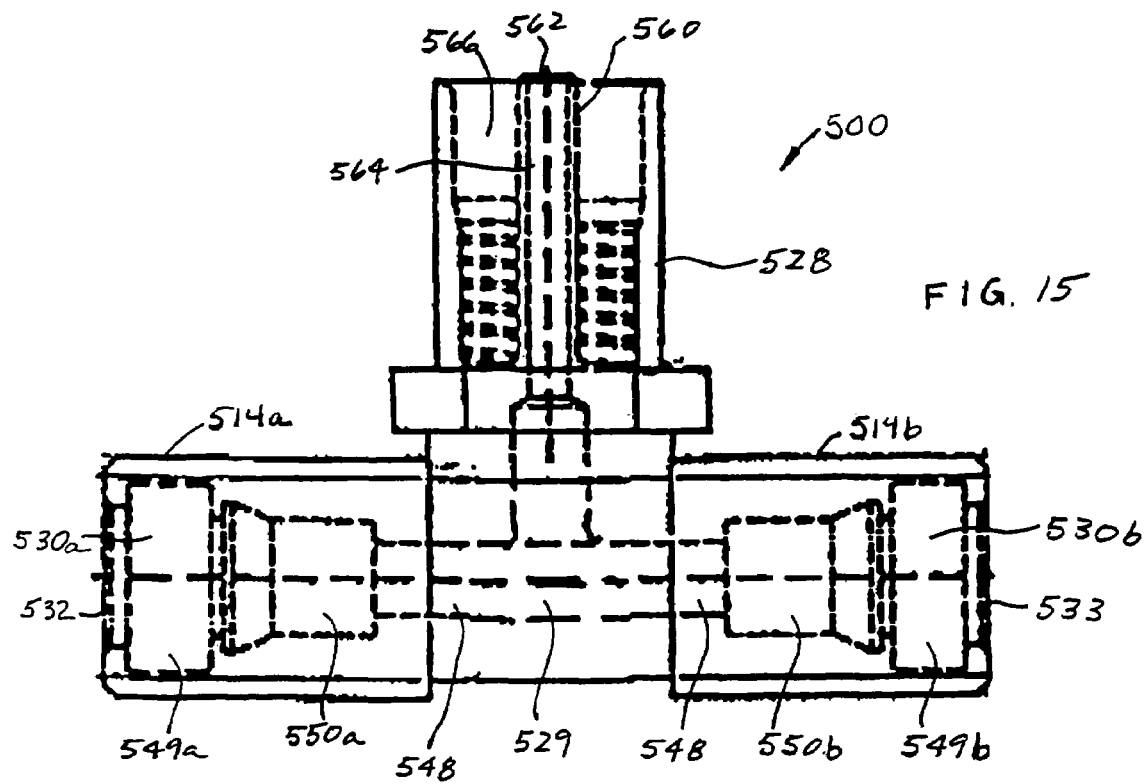
FIG. 15 is a sectional view of a multiple port fluid coupling embodying the present invention.

The coupling 500 of a further embodiment in accordance with the present invention is illustrated in FIG. 15. The connector body portion 514 is dual ended, 514a and 514b and defines a bore 529 extending through the connector body portion 514 from a first opening 532 to a second opening 533. Inwardly of each opening 532 and 533 is a receiving section. Each receiving section 530a and 530b is divided into three portions: a retainer receiving portion 549, a seal receiving portion 550, and a reduced diameter portion 548. Each receiving section is adapted to receive an O-ring, a spacer and a retainer similar to the O-ring 218, the seal retainer 217, and the retainer 216 of the embodiment of FIGS. 2-14.

The coupling 500 further includes a cylindrical crimp collar 528. Located radially inward of the crimp collar 528 is a barrel 560 defining a third opening 562 to a barrel bore 564 extending into the coupling 500. The barrel bore 564 intersects the bore 529 to provide fluid communication between all connected fluid system elements.

An annular groove 566 is defined radially between radially inner surface of the crimp collar 528 and the radially outer surface of the barrel 560. It receives an end of a hose such as hose 419 described earlier. Crimp collar 528 is crimped onto hose 419 as illustrated in FIG. 1 to connect the coupling 500 to the hose. Rigid tubes, such as tube 220, are inserted into quick connector portions 532 and 533 to complete a fluid system.

It should be noted that the embodiment of FIG. 15 is for purposes of illustrating the utility of a coupling embodying the present invention and is not limiting. For example, the coupling could include more than two quick connector portions. It could also include more than one crimp connection as well.

Various features of the present invention have been described with reference to the preferred embodiments. It should be understood that modifications may be made to the connector for connecting a hose to a metal tube without departing from the spirit and scope of the present invention as recited by the following claims.

We claim:

1. A fluid coupling for connecting a rigid tube and a hose comprising:
   a body having at least one quick connector portion for receiving a rigid tube and a hose connection portion for receiving a flexible hose;
   a through bore defining a fluid path;
   said at least one quick connector portion including a rim defining an entrance opening to said bore and a radially inward extending annular rib within said bore axially forward of said rim;
   said body defining a retainer receiving portion of said bore between said rim and said rib and a seal receiving portion axially forward of said rib;
   a separate seal member retainer disposed within said seal receiving portion of said bore axially forward of said rib and held against axial movement out of said seal receiving bore by said rib;
   said separate seal member retainer including a ring slidable relative to said body having a forward facing abutment surface and including a plurality of axially extending legs, each said leg including a rear abutment surface in abutting relation with said annular rib;
   the axial extent of said seal member retainer being from said forward abutment surface to said rear abutment surfaces of said legs;
      said hose connector portion including a crimp connection for a hose.

2. A fluid coupling as claimed in claim 1 wherein said body includes a plurality of quick connector portions, each including a tube receiving bore in fluid communication with said bore of said coupling, each said bore having a rim defining an entrance opening, said body defining a retainer receiving portion adjacent each said rim and a seal receiving portion adjacent each said retainer receiving portion and a separate seal member retainer disposed in each said seal receiving portion.

3. A fluid coupling for connecting a rigid tube and a hose comprising:
   a body having a quick connector portion for receiving a rigid tube and a hose connection portion for receiving a flexible hose;
   a through bore defining a fluid path;
   said quick connector portion including a rim defining an entrance opening to said bore and a radially inward extending annular rib within said bore axially forward of said rim;
   said body defining a retainer receiving portion of said bore between said rim and said rib and a seal receiving portion axially forward of said rib;
   a separate seal member retainer disposed within said seal receiving portion of said bore axially forward of said rib and held against axial movement out of said seal receiving bore by said rib;
   wherein said seal member retainer includes a ring, slidable relative to said body having a forward facing abutment surface and a plurality of axially extending legs that extend axially rearwardly and radially outwardly therefrom, each said leg including a rear abutment surface in abutting relation with said annular rib;
   the axial extent of said seal member retainer being from said forward abutment surface to said rear abutment surfaces of said legs;
   said hose connector portion including a crimp connection for a hose.

4. A fluid coupling as claimed in claim 3 wherein said body includes a plurality of quick connector portions each including a tube receiving bore in fluid communication with said bore of said coupling, each said bore having a rim defining an entrance opening, said body defining a retainer receiving portion adjacent each said rim and a seal receiving portion adjacent each said retainer receiving portion, a separate seal member retainer disposed in each said seal receiving portion and a tube retainer disposed in each said retainer receiving portion.

5. A fluid coupling as claimed in claim 4 wherein said coupling includes a rigid tube connected to each said tube receiving bore by one of said tube retainers and said hose connection portion includes a flexible hose connected to said coupling by said crimp connection.

6. A fluid coupling assembly as claimed in claim 3 wherein a sealing member is disposed in said seal receiving portion of said bore in abutting relation with said forward abutment surface of said ring.

7. A fluid coupling assembly as claimed in claim 6 wherein said rib of said body includes a radially directed annular seal member retention surface and said legs of said seal member retainer are disposed with said rear abutment surfaces in abutting relation to said radially directed annular seal member retention surface.

8. A fluid coupling assembly as claimed in claim 7 wherein said seal receiving portion includes a cylindrical sealing surface, a seal member in sealing relation to said sealing surface, and said cylindrical sealing surface surrounds said ring of said seal member retainer in closely spaced piloting relation.

9. A fluid coupling assembly as claimed in claim 8 wherein said assembly includes a ring made of Teflon interposed between said seal member and said seal member retainer.

10. A fluid coupling assembly as claimed in any one of claims 1, 3, or 7 wherein said assembly further includes a tube retainer having plurality of extending arms, each said arm including a forward abutment surface and a rear abutment surface, said rear abutment surfaces in abutting relation with said rim, and said tube retainer further includes a ring, said arms extend axially forward from said ring, and at least a portion of said ring is disposed outside of said connector body at said entrance opening.

11. A fluid coupling assembly as claimed in claim 10 wherein said ring of said tube retainer defines a forward facing radial surface and a reduced diameter cylindrical portion and wherein said locking arms are separated by slots and extend axially forward from said reduced diameter cylindrical portion and wherein said slots between said locking arms extend into said reduced diameter cylindrical portion.

12. A fluid coupling as claimed in claim 10 wherein said tube retainer includes four of said extending arms.

13. A fluid coupling as claimed in claim 10 wherein said rear abutment surfaces of said axially extending legs of said separate seal member retainer are disposed axially forward of said forward abutment surfaces of said arms of said tube retainer.

14. A fluid coupling as claimed in claim 13 wherein said coupling includes a rigid tube in said tube receiving bore and said hose connection portion includes a flexible hose connected to said coupling by said crimp connection.

15. A fluid coupling assembly as claimed in any one of claims 1, 3, 2, 4, 5, or 7, wherein said crimp connection comprises:
   a crimp collar or shell surrounding an axially extending tubular barrel in communication with said bore;
   said crimp collar and barrel defining an axially extending annular groove to receive the end of a flexible hose;

wherein said tube receiving portion of said coupling includes a rigid tube releasably connected to said quick connector portion and said hose connection portion includes a flexible hose disposed in said annular groove and connected to said coupling by said crimp connection; and said crimp collar is crushed radially inwardly and said flexible hose is pinched between said crimp collar and said barrel.

16. A fluid coupling as claimed in any one of claims 1, 3, or 7 wherein said seal member retainer includes four of said spaced apart axially extending legs.

17. A fluid coupling as claimed in any one of claims 1, 3, or 7 wherein said coupling includes a rigid tube in said tube receiving bore and said hose connection portion includes a flexible hose connected to said coupling by said crimp connection.

* * * * *